(12) United States Patent
Xu et al.

(10) Patent No.: US 9,912,852 B2
(45) Date of Patent: Mar. 6, 2018

(54) REAL-TIME, ULTRAFAST FRAMING OPTICAL IMAGING DEVICE WITH HIGH SPATIAL RESOLUTION

(71) Applicant: SHENZHEN UNIVERSITY, Shenzhen, Guangdong (CN)

(72) Inventors: Shixiang Xu, Guangdong (CN); Wenting Chen, Guangdong (CN); Xuanke Zeng, Guangdong (CN); Shuiqin Zheng, Guangdong (CN); Yi Cai, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 189 days.

(21) Appl. No.: 15/140,528

(22) Filed: Apr. 28, 2016

(65) Prior Publication Data

US 2016/0241759 A1  Aug. 18, 2016

Related U.S. Application Data

(63) Continuation of application No. PCT/CN2015/080045, filed on May 28, 2015.

(30) Foreign Application Priority Data

Jul. 16, 2014 (CN) .......................... 2014 1 0337541

(51) Int. Cl.
| | |
|---|---|
| *H04N 5/00* | (2011.01) |
| *H04N 5/225* | (2006.01) |
| *G02F 1/39* | (2006.01) |
| *G02F 1/35* | (2006.01) |
| *G03B 39/00* | (2006.01) |
| *H04N 5/247* | (2006.01) |
| *H04N 5/372* | (2011.01) |

(52) U.S. Cl.
CPC ......... *H04N 5/2256* (2013.01); *G02F 1/3532* (2013.01); *G02F 1/39* (2013.01); *G03B 39/005* (2013.01); *H04N 5/247* (2013.01); *H04N 5/372* (2013.01); *G03B 2215/0596* (2013.01)

(58) Field of Classification Search
CPC ..... H04N 5/2256; H04N 5/247; G02F 1/3532
USPC ........................................................ 348/135
See application file for complete search history.

(56) References Cited

FOREIGN PATENT DOCUMENTS

CN 101976016 A * 2/2011

* cited by examiner

*Primary Examiner* — Jeffery Williams

(57) ABSTRACT

The present application relates to the technical field of ultrafast imaging, and provides an ultrafast framing optical imaging device with a real-time high spatial resolution. The optical imaging device includes an ultrashort pulse laser system with a magnitude of femtosecond, a frequency multiplier, a wavelength splitter, a continuous illumination laser, a sampling plate, a calibration camera, a first imaging record module, and a second imaging record module. The present application mainly utilizes continuous light illumination ultrafast events and non-collinear light parameter amplifying technology that uses ultrashort pulse laser to pump/sample events at different moments, and adopts a plurality of CCD cameras to receive corresponding idle light images simultaneously and respectively and thereby realize ultrafast framing optical imaging with a high time resolution.

7 Claims, 1 Drawing Sheet

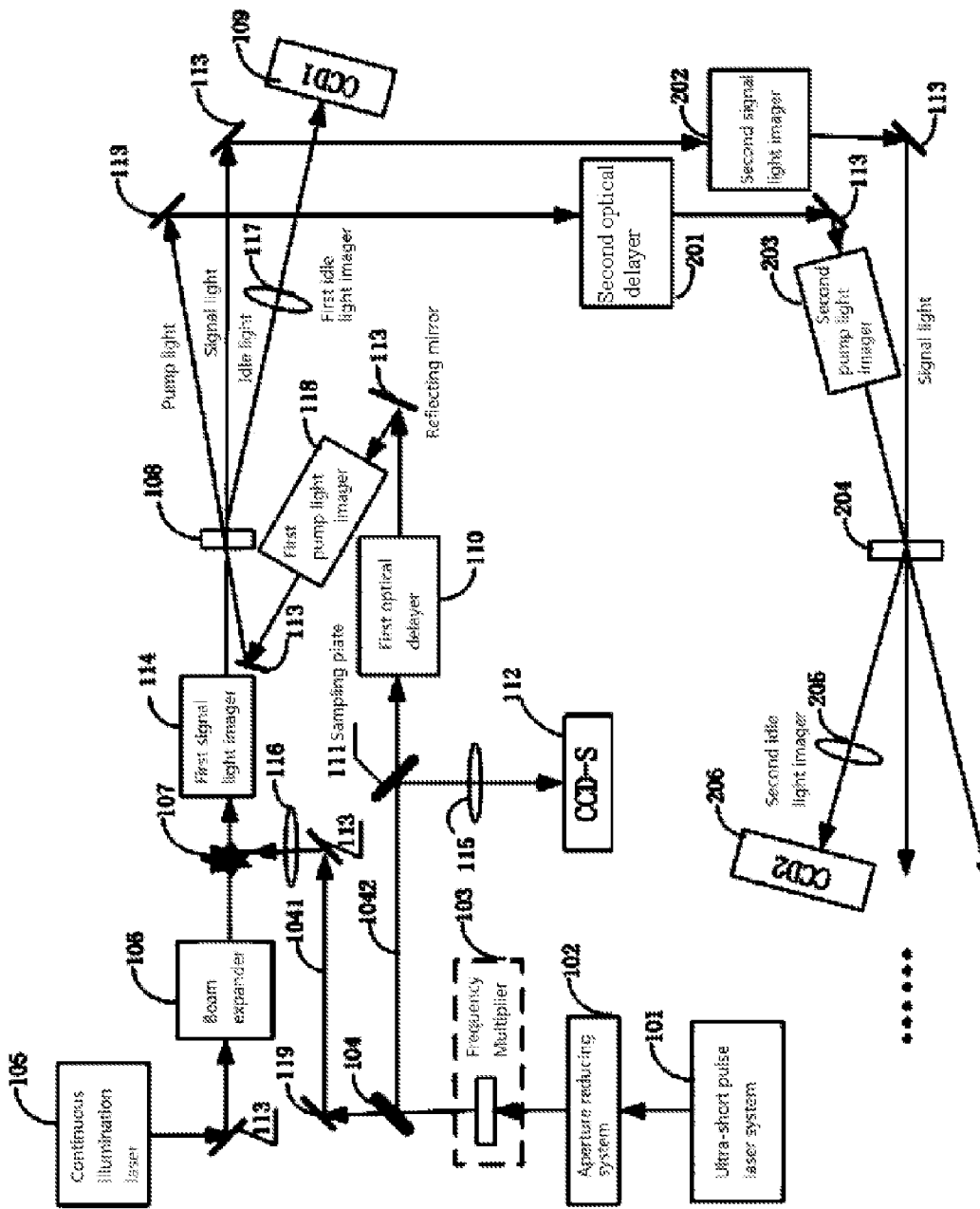

REAL-TIME, ULTRAFAST FRAMING OPTICAL IMAGING DEVICE WITH HIGH SPATIAL RESOLUTION

CROSS-REFERENCE TO RELATED APPLICATIONS

The present application is a Continuation Application of PCT application No. PCT/CN2015/080045 filed on May 28, 2015, which claims the benefit of Chinese Patent Application No. 201410337541.3 filed on Jul. 16, 2014, the contents of which are hereby incorporated by reference.

TECHNICAL FIELD

The present application relates to the technical field of ultrafast imaging, and more particularly to a real-time ultrafast framing optical imaging device with high spatial resolution.

BACKGROUND

To investigate the transient evolutions of the physical processes is always very interesting in many fields, such as physics, chemistry, biomedicine, and so on. To capture images of these physical processes accurately allows us to disclose their dynamic laws thereby to control or utilize the processes. Different processes may have different temporal characteristics. Correspondingly, to image them needs different time resolutions. An optical image may be required a time resolution with an order of magnitude of millisecond or sub-millisecond for the transient processes, e.g. the collisions between some particles; an order of magnitude of microsecond or sub-microsecond for some processes, e.g. some explosions or shock waves; an order of magnitude of nanosecond or sub-nanosecond for the high-voltage discharge and laser flying events; an order of magnitude of picosecond or sub-picosecond for the decay and migration of phonons and excitons in solids, the phase demodulation time and molecular vibrational relaxation in liquids, and growth and decay processes of plasma in gases and solids; even an order of magnitude of femtosecond or sub-femtosecond for molecular structure dynamics (atomic motions on atomic scales, such as vibrations, breaking and forming of chemical bonds, and so on). Recent researches show the movements of high-energy ions and thermal energy electrons, movements of valence electrons in a molecular, and dynamics of electrons in an atomic shell have their time scales with an order of magnitude of attosecond or sub-attosecond.

Besides the time resolution, a high spatial resolution for imaging is also very important. The aforementioned transient processes can be divided into two types: one type of transient processes occurs periodically and repeatedly, and the other works in single-shot mode, or with very low repetition rates. The former can be recorded by the pump-probe technology with a high time resolution which is determined by pulse durations of the probe beam. The development of the ultrafast laser technology has already pushed the time resolution to femtosecond, even attosecond level. For the single-shot processes, or those with very low repetition rates, to record these processes requires a high time resolution, a large frame rate and frame number. It is obvious that the pump-probe technology cannot work for real-time optical imaging.

It is well known that the key technical parameters of ultrafast framing imaging for the single-shot transient events include spatial resolution, time resolution, framing rate, framing number, and so on. Besides illumination wavelengths, high spatial resolution also depends on the transfer function of an optical imaging system. High time resolution depends on the shutter time for imaging. High framing rate is also very important for recording ultrafast events. If the framing images propagate collinearly, the framing rate is restricted by the response speed of the used recording medium. Scan recording can get rid of this restriction, however, it brings with another restriction, that is, the scan speed. Thus far, a framing frequency realized by the scan method is difficult to exceed $10^9$ fps.

SUMMARY

The present invention aims to provide a real-time ultrafast framing optical imaging device with a high spatial resolution in order to present the framing rate from the conventional limitation of the scanning speed for the single-shot ultrafast imaging.

The present invention is a real-time ultrafast framing optical imaging device with high spatial resolution. It comprises a femtosecond pulse laser system, a second-harmonic generator, a wavelength splitter, a continuous illumination laser, a sampling plate, a calibration camera; the first imaging record module, the second imaging record module . . . .

The continuous illumination laser emits continuous signal beam to illuminate a measured object;

The femtosecond pulse laser system outputs ultrashort pulse laser, part of which is used to excite an ultrafast event;

The second-harmonic generator is set to generate second-harmonics of the ultrashort laser pulse which is used to pump the optical parameter amplifiers;

The wavelength splitter is used to separate a fundamental pulse from the second harmonics;

The sampling plate and the calibration camera are used to calibrate spatial intensity distribution of pump beam;

The first imaging record module includes the first optical time delay line, the first pump imager (optical imager for pump beam), the first signal imager (optical imager for signal beam), the first optical parameter amplifier, the first idler imager (optical imager for idle beam), and the first CCD camera. The second-harmonic pulses pass through the first time-delay line and the first pump imager to pump the first optical parameter amplifier. The continuous signal beam illuminating the measured object passes through the first signal imager and then works as the signal of the first optical parameter amplifier; the first pump amplifies the continuous signal beam transiently inside the first parameter amplifier and thereby generates first idle beam. The first idle passes through the first idle imager, then is recorded by the first CCD camera.

The second imaging record module includes a second optical time delay line, a second pump imager, a second signal imager, a second parameter amplifier, a second idle imager, and a second CCD camera. After passing through the first imaging record module, the first pump beam serves as second pump beam, which, through the second optical time delay line and the second pump imager, inputs the second parameter amplifier; leaving the first imaging record module, the first signal beam passes through the second signal imager and inputs the second parameter amplifier as the second signal beam; the second pump beam amplifies the second signal beam transiently at the second parameter amplifier, meanwhile to generate the second idle beam; After passing through the second idle imager, the second idle beam is recorded by the second CCD camera.

The ultrafast framing optical imaging device can comprise further more imaging record modules: the third imaging record module, the fourth imaging record module . . . , the (n−1)th imaging record module, and a nth imaging record module. Every imaging record module includes an optical time delay line, an pump imager, an optical parameter amplifier, an signal imager, an idle imager, and a CCD camera.

The (n−1)th signal and the (n−1)th pump beams pass through the (n−1)th imaging record module, and then enter the nth imaging record module serving as the nth signal beam and the nth pump beams, respectively. The nth pump beam passes through the nth optical time delay line and the nth pump imager before inputting the nth optical parameter amplifier, while the nth signal passes through the nth signal imager before irradiating the nth optical parameter amplifier. The nth pump beam amplifies the nth signal beam transiently at the nth optical parameter amplifier and generates the nth idle beam. After passing through the nth pump imager, the nth idle beam is recorded by the nth CCD camera.

The ultrafast framing optical imaging device further comprises a telescope optical system to reduce the beam spot of the ultrashort pulse laser from the femtosecond pulse laser system.

The ultrafast framing optical imaging device further comprises the first convex lens, and the first convex lens is arranged in front of the calibration camera to cooperate with the calibration camera to measure spatial intensity distribution of the harmonic of the ultrashort pulses.

In the ultrafast framing optical imaging device, the ultrafast framing optical imaging device further comprises a second lens system, and the second lens system is arranged behind the wavelength splitter to focus the ultrashort pulse laser and generate ultrafast events.

In the ultrafast framing optical imaging device, wherein the first parameter amplifier, the second parameter amplifier . . . , and the nth parameter amplifier are all non-collinear parameter amplifiers.

In the ultrafast framing optical imaging device, wherein the first signal imager, the second signal imager, . . . , and the nth signal imager can be respectively replaced by a first signal beam Fourier converter, a second signal beam Fourier converter, . . . , and a nth signal beam Fourier converter; correspondingly, the first idle imager, the second idle imager, . . . , and the nth idle imager can be respectively replaced by a first idle beam Fourier converter, a second idle beam Fourier converter, . . . , and a nth idle beam Fourier converter.

Compared with the prior art, the present application has the following benefits: the real-time ultrafast framing optical imaging device with high spatial resolution can record single ultrafast imaging of transient events with a time resolution in an order of sub-picosecond. The imaging device comprising the continuous illumination laser and the ultrashort pulse laser system switches the information of the framing images at different moments and generate a series of idle images by a series of parameter amplifiers. The idle images are recorded by a series of CCD cameras to realize ultrafast framing optical imaging with high resolution, and the framing imaging records have no requirement for response speeds of the CCD cameras. By adopting this ultrafast framing optical imaging device, real-time imaging with a spatial resolution being larger than 20 lines/mm, a time resolution in an order of magnitude of femtoseconds, and a framing frequency in an order of magnitude of $10^{12}$ fps can be realized.

BRIEF DESCRIPTION OF THE DRAWING

The present invention, a real-time ultrafast framing optical imaging device with a high spatial resolution, can be illustrated in the FIGURE.

DETAILED DESCRIPTION OF THE PREFERRED EMBODIMENT

In order to illustrate clearly the purposes, the technical solutions, and the advantages of the present application, the present application will be further described hereafter with reference to the accompanied drawing and embodiments. It should be understood that the embodiments described herein are only intended to illustrate but incapable to limit the present application.

The present application mainly utilizes continuous beam illumination ultrafast events and non-collinear beam parameter amplifying technology that uses ultrashort pulse laser to pump/sample events at different moments, and adopts a series of CCD cameras to receive corresponding idle beam images simultaneously and respectively and thereby realize ultrafast framing optical imaging with a time resolution in an order of sub-picosecond.

The Figure illustrates an embodiment of the present application. An real-time ultrafast framing optical imaging device with high spatial resolution comprises an femtosecond pulse laser system 101, a frequency multiplier 103, a wavelength splitter 104, a continuous-wave laser 105, a sampling plate 111, a camera for calibration CCD-S 112, a first imaging record module, and a second imaging record module. The continuous-wave laser 105 emits continuous signal beam to illuminate a measured object 107. The femtosecond pulse laser system 101 outputs ultrashort pulse laser which can also be used to excite an ultrafast event to the frequency multiplier 103. The frequency multiplier 103 can multiply the frequency of the ultrashort pulse laser thereby obtain ultrashort pulse frequency-multiplied beam. The harmonic of the ultrashort pulse is used to pump parameter amplifier. The pumped parameter amplifiers include a first parameter amplifier 108, a second parameter amplifier 204, a third parameter amplifier . . . , and a nth parameter amplifier. The wavelength splitter 104 separates a fundamental wave 1041 from the harmonic of the ultrashort pulse 1042. The sampling plate 111 and the calibration camera CCD-S 112 are used to record spatial intensity distribution of pump beam. The fundamental ultrashort pulse is used to pump the measured object 107 and excite the ultrafast event. When the fundamental wave 1041 and the continuous beam irradiate the measured object 107 simultaneously, the continuous beam then carries the information of the measured object 107 which can be transformed to the idle beam by optical parametric amplifier.

The first imaging record module includes a first optical time delay line 110, a first pump imager 118, a first signal imager 114, the first parameter amplifier 108, a first idle imager 117, and a first CCD camera 109. The harmonic of the ultrashort pulse 1042 passes through the first optical time delay line 110 and the pump imager 118 to pump the first parameter amplifier 108. The continuous beam having illuminated the measured object 107 passes through the first signal imager 114 and inputs the first parameter amplifier 108. The harmonic of the ultrashort pulse 1042 amplifies the continuous signal beam transiently when passing through the first parameter amplifier 108, and thus the first idle beam is generated; the first idle beam carries information of the earliest occurring time t1 of the ultrafast event, and a time resolution depends on the pulse duration of the pump beam. When the first idle beam passes through the first idle imager 117, the information of the first idle beam is recorded by the first CCD camera 109.

The second imaging record module includes a second optical time delay line 201, a second pump imager 203, a second signal imager 202, the second parameter amplifier 204, a second idle imager 205, and a second CCD camera 206; the first pump beam having passed through the first imaging record module serves as second pump beam, which passes through the second optical time delay line 201 and the second pump imager 203 and irradiates the second parameter amplifier 204. The first signal beam having passed through the first imaging record module serves as second signal beam, which passes through the second signal imager 202 and irradiates the second parameter amplifier 204; the second pump beam amplifies the second signal beam transiently at the second parameter amplifier 204, so that second idle beam is generated; the second idle beam carries information of the second occurring time t2 of the ultrafast event. When the second idle beam passes through the second idle imager 205, the information of the second idle beam is recorded by the second CCD camera 206.

In the above-described embodiment, the ultrafast framing optical imaging device further comprises a series of imaging record modules, and the imaging record modules are respectively a third imaging record module, a fourth imaging record module . . . , a (n−1)th imaging record module, and a nth imaging record module. Each of the imaging record modules includes an optical time delay line, a signal imager, a pump imager, a parameter amplifier, an idle imager, and a CCD camera, that is, all of the imaging record modules include identical main components. The nth imaging record module includes a nth optical time delay line, a nth pump imager, a nth parameter amplifier, a nth signal imager, a nth idle imager, and a nth CCD camera. Preferably, the first parameter amplifier 108, the second parameter amplifier 204 . . . , the (n−1)th parameter amplifier, and the nth parameter amplifier are all non-collinear parameter amplifiers. (n−1)th signal beam and (n−1)th pump beam having passed through the (n−1)th imaging record module serve as nth signal beam and nth pump beam respectively and enter the nth imaging record module, the nth pump beam passes through the nth optical time delay line and the nth pump imager and irradiates the nth parameter amplifier, and the nth signal beam passes through the nth signal imager and irradiates the nth parameter amplifier too. The nth pump beam amplifies the nth signal beam transiently at the nth parameter amplifier and generates nth idle beam; when the nth idle passes through the nth idle imager, information of the nth idle beam is recorded by the nth CCD camera. The number n of the imaging record modules depends on the framing number, and the framing frequency depends on time intervals between the n moments. Since the adopted parameter amplifiers are all non-collinear parameter amplifiers, it is easy to isolate idle beam from signal and pump beams. Moreover, all the idle beams are spatially separated from each other, and thus the images are easy to be received by the series of CCD cameras.

In the above-described embodiment, the first signal imager 114, the second signal imager 202, . . . , and the nth signal imager can be respectively replaced by a first signal beam Fourier converter, a second signal beam Fourier converter, . . . , and a nth signal beam Fourier converter; correspondingly, the first idle imager 117, the second idle imager 205 . . . , and the nth idle imager can be respectively replaced by a first idle beam Fourier converter, a second idle beam Fourier converter, . . . , and a nth idle beam Fourier converter.

The ultrafast framing optical imaging device can further include an aperture reducing system 102, a first convex lens 115, a second lens system 119, and a beam expander 106. The aperture reducing system 102 reduces a beam size of a ultrashort pulse laser output from the femtosecond pulse laser system 101. The first convex lens 115 is arranged in front of the calibration camera 112 to cooperate with the calibration camera 112 to measure spatial intensity distribution of harmonic of the ultrashort pulse. The second lens system 110 is arranged behind the wavelength splitter 104 to focus the ultrashort pulse laser and generate ultrafast events. The beam expander 106 is configured to expand the continuous light emitted by the continuous illumination laser 105, and the expanded continuous signal beam irradiates the measured object 107.

In order for the beam intensity and the compactness of the whole ultrafast framing optical imaging device, the ultrafast framing optical imaging device further comprises a series of reflecting mirrors 113. The reflecting mirrors 113 are configured to change transmission directions of the pump, signal beam, or idle beams. The reflecting mirrors 113 can be arranged behind the continuous illumination laser 105, in front of and behind the first parameter amplifier 108, behind the wavelength splitter 104, in front of the second signal imager 202, behind the second signal imager 202, behind the second optical time delay line 201, or at any possible positions, as specifically shown in the FIGURE. In different application situations, the number and the arranging positions of the reflecting mirrors 113 can be changed according to actual requirements.

The present application adopts a continuous beam source to illuminate ultrafast events of the measured object 107, so that the continuous laser carries information at different moments of the event at different time slices. By an imaging optical system or a Fourier converting optical system, the image plane where an event occurs or a spatial Fourier plane of the event is imaged on an optical parameter amplifying crystal; when the pump beam meets the continuous laser in the parameter crystal, continuous beam carrying information which indicates that the ultrafast event occurs at a certain moment is generated, and thus the idle beam emitted from the first parameter amplifier 108 carries the event information at this moment. An event image at this moment can be obtained by using the CCD camera to record the idle beam information. Therefore, at this time, the pump beam is equivalent to an optical shutter, and a time resolution of the idle image depends on the pulse width of the pump beam. By use of the multi-stage parameter amplifiers, when the pump beam meets the continuous laser in the parameter crystals of different stage parameter amplifiers, the corresponding continuous beam carries ultrafast event information corresponding to different time points, thus the corresponding idle beam carries the ultrafast event information corresponding to different time points too; by record using respective CCD cameras, framing images of the ultrafast event are obtained. The framing frequency depends on the difference between time points of imaging events of adjacent amplifiers. Besides the kinds and thicknesses of the parameter crystals, the phase-matching conditions, and so on, the spatial resolution further depends on the intensity of the pump beam. The framing number depends on the stages of the parameter amplifiers.

The ultrashort pulse laser system 101 can adopt a titanium-doped sapphire femtosecond laser system with a wavelength of 800 nm, or a femtosecond laser system with a wavelength of 1064 nm, but it is not limited to femtosecond laser systems with the wavelength of 800 nm or 1064 nm. The pump wavelength emitted by the ultrashort pulse laser system 101 can be a fundamental wave, and can also be a second harmonic or even a third harmonic; the selection for the pump wave depends on the parameter amplifying effects for the continuous beam and the signal beam.

The ultrashort pulse laser system 101 has the following advantages:

The continuous beam source has a compact structure and a low price, and thus it is easy to be replaced. The wavelength of the continuous beam emitted by the continuous illumination laser 105 can be selected according to the requirement for the imaging spectrum, and the range of the wavelength can be from visible 500 nm to near-infrared.

The femtosecond laser pump has its available pump intensity up to hundreds of $GW/cm^2$, high parameter gain and very wide bandwidth, all of which is beneficial for high spatial resolution of imaging and amplification with weak seeds.

The imaging framing number depends on the power of the ultrashort pulse laser and the stages of the parameter amplifiers, the framing frequency depends on the differences between times for transmitting the pump pulse relative to the signal beam between the parameter amplifiers, and the framing frequency can reach as high as $10^{12}$ fps.

Since the information of the framing images have separated spatially information, thereby can be received by its respective CCD camera, so this invention has no high response requirement for the CCD camera and needn't any scan setup.

The imaging time resolution depends on the pump pulse widths of the parameter amplifiers, and the time resolution can reach femtosecond region.

What described above are only preferred embodiments of the present application, and are not intended to limit the scope of the present application. Any modifications, equivalent replacements, and improvements made within the spirit and principle of the present application, for example, adding or omitting the reflecting mirrors in the device to change the propagation directions of the included light beams, adding or omitting the lens system to change the transmission scales of the light beams, and so on, should be included in the protection scope of the present application.

What is claimed is:

1. A real-time ultrafast framing optical imaging device with high spatial resolution, comprising: an femtosecond pulse laser system, a frequency multiplier, a wavelength splitter, a continuous illumination laser, a sampling plate, a calibration camera, a first imaging record module, and a second imaging record module;

wherein the continuous illumination laser emits continuous signal light to illuminate an object to be measured;

the femtosecond pulse laser system outputs an ultrashort pulse laser, the ultrashort pulse laser is used to excite an ultrafast event;

the frequency multiplier is configured to multiply the frequency of the ultrashort pulse laser to obtain the harmonic of the ultrashort pulse, to pump parameter amplifier;

the wavelength splitter is used to separate a fundamental wave from harmonic of the ultrashort pulse;

the sampling plate and the calibration camera are configured to record spatial intensity distribution of pump light;

the first imaging record module comprises a first optical time delay line, a first pump imager, a first signal imager, a first parameter amplifier, a first idle imager, and a first CCD camera; the harmonic of the ultrashort pulse passes through the first optical time delay line and the first pump imager and irradiates the first parameter amplifier to generate first pump light; the continuous signal light having illuminated the object to be measured passes through the first signal imager and irradiates the first parameter amplifier to generate a first signal light; the harmonic of the ultrashort pulse amplifies the continuous signal light transiently when passing through the first parameter amplifier and thereby generates a first idle light; when the first idle light passes through the first idle imager, information of the first idle light is recorded by the first CCD camera;

the second imaging record module comprises a second optical time delay line, a second pump imager, a second signal imager, a second parameter amplifier, a second idle imager, and a second CCD camera; the first pump light having passed through the first imaging record module serves as a second pump light which passes through the second optical time delay line and the second pump imager and irradiates the second parameter amplifier; the first signal light having passed through the first imaging record module serves as a second signal light which passes through the second signal imager and irradiates the second parameter amplifier; the second pump light amplifies the second signal light transiently at the second parameter amplifier, so that a second idle light is generated; when the second idle light passes through the second idle imager, information of the second idle light is recorded by the second CCD camera.

2. The ultrafast framing optical imaging device of claim 1, wherein the ultrafast framing optical imaging device further comprises a plurality of imaging record modules, and the plurality of imaging record modules are respectively a third imaging record module, a fourth imaging record module, . . . , a (n−1)th imaging record module, and a nth imaging record module; the nth imaging record module comprises a nth optical time delay line, a nth pump imager, a nth parameter amplifier, a nth signal imager, a nth idle imager, and a nth CCD camera;

the (n−1)th signal light and (n−1)th pump light having passed through the (n−1)th imaging record module serve as nth signal light and nth pump light respectively and enter the nth imaging record module, the nth pump light passes through the nth optical time delay line and the nth pump imager and irradiates the nth parameter amplifier; the nth signal light passes through the nth signal imager and irradiates the nth parameter amplifier; the nth pump light amplifies the nth signal beam transiently at the nth parameter amplifier and generates a nth idle light;

when the nth idle light passes through the nth idle imager, information of the nth idle light is recorded by the nth CCD camera.

3. The ultrafast framing optical imaging device of claim 1, wherein the ultrafast framing optical imaging device further comprises an aperture reducing system, and the aperture reducing system reduces a size of a light spot formed by ultrashort pulse laser output by the ultrashort pulse laser system.

4. The ultrafast framing optical imaging device of claim 1, wherein the ultrafast framing optical imaging device further comprises a first convex lens, and the first convex lens is arranged in front of the calibration camera to cooperate with the calibration camera to measure spatial intensity distribution of the harmonic of the ultrashort pulse.

5. The ultrafast framing optical imaging device of claim 1, wherein the ultrafast framing optical imaging device further comprises a second lens system, and the second lens system is arranged behind the wavelength splitter to focus the ultrashort pulse laser and generate an ultrafast event.

6. The ultrafast framing optical imaging device of claim 2, wherein the first parameter amplifier, the second parameter amplifier, . . . , and the nth parameter amplifier are all non-collinear parameter amplifiers.

7. The ultrafast framing optical imaging device of claim 2, wherein the first signal imager, the second signal imager, . . . , and the nth signal imager are respectively replaced by a first signal light Fourier converter, a second signal light Fourier converter . . . , and a nth signal light Fourier converter; correspondingly, the first idle imager, the second idle imager, . . . , and the nth idle imager are respectively replaced by a first idle light Fourier converter, a second idle light Fourier converter, . . . , and a nth idle light Fourier converter.

* * * * *